Figure 1:
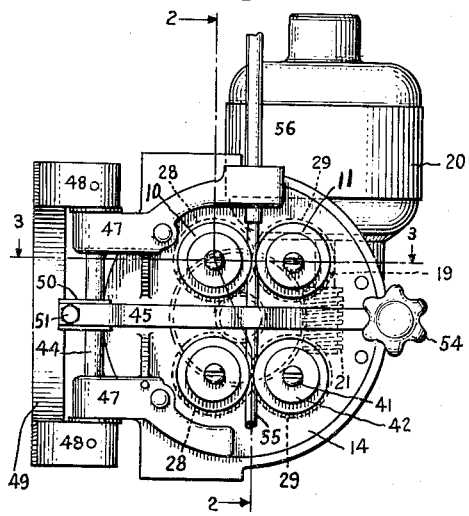

Feb. 3, 1942.  J. E. ANDERSON  2,272,158
ARC WELDING HEAD
Filed Nov. 28, 1940

Inventor:
Jasper E Anderson,
by Harry E. Dunham
His Attorney.

Patented Feb. 3, 1942

2,272,158

UNITED STATES PATENT OFFICE 2,272,158

ARC WELDING HEAD

Jasper E. Anderson, Saugus, Mass., assignor to General Electric Company, a corporation of New York Application November 28, 1940, Serial No. 367,559

5 Claims. (Cl. 219—8)

My invention relates to an improved electrode feeding mechanism for automatic arc welding heads.

Automatic arc welding heads are usually employed for repetitive welding operations especially where the seams to be welded are of relatively simple contour such as circles or straight lines. These welding heads embody an electrode feeding mechanism which is operated by a motor forming part of a control system. The control systems usually employed embody means which is responsive to an electrical characteristic of the welding circuit and which functions to operate the motor of the welding head and the electrode feeding mechanism driven thereby to feed an electrode to and from the work to strike and thereafter maintain a welding arc.

Due to variations in sizes of electrodes required for various welding operations, some means must be provided for adapting the feeding mechanism of an automatic arc welding head to the various sizes of electrodes employed. When the electrodes are engaged and fed by a pair of rolls which are oppositely disposed to one another, means are usually provided for adjusting the spacing of the shafts of these feed rolls. Such means embodying as it does linkages or slides frequently interferes with other adjusting devices provided on the welding head, and consequently complicates the structure of the welding head. Furthermore, where oppositely disposed pairs of feed rolls are geared together in order to increase their tractive effort on the electrode which they engage and feed, the gearing interconnecting the feed rolls usually works at a disadvantage due to the imperfect meshing of the gears resulting from the adjustable spacing of the feed roll shafts. This adjustment of the spacing of the feed roll shafts also makes it difficult, if not impossible, properly to lubricate the gears and to shield them from the dust and dirt almost always present in welding shops.

All the advantages resulting from a fixed spacing of the feed roll shafts may be obtained by using beveled feed rolls as disclosed and claimed in my United States Letters Patent 2,170,673 of August 22, 1939, for Wire-feeding device. Although the arrangement of this patent is admirably suited for feeding bare or lightly coated electrodes, it is not satisfactory in every respect for feeding heavy coated electrodes from a continuous coil. For feeding heavy coated electrodes, feed rolls of rubber or other similar elastic material are required in order to make a substantial engagement with and prevent damage to the electrode flux coating which is frangible and consequently incapable of sustaining localized pressure without cracking or crumbling from the electrode.

It is an object of my invention to provide an electrode feeding mechanism for arc welding heads in which the proper adjustment for different sizes of electrodes is obtained by adjusting the diameters of expansible feed rolls which are positioned opposite one another and mounted on and rotate with a pair of shafts spaced from one another by a fixed distance.

It is also an object of my invention to provide an electrode feeding mechanism embodying feed roll shafts spaced from one another by a fixed distance, rubber feed rolls or tires mounted on these shafts, and means for adjusting the diameters of these feed rolls or tires. Such a mechanism is admirably suited for feeding heavy coated electrodes of different sizes as well as for feeding bare and lightly coated electrodes.

Further objects of my invention will become apparent from the following description of one embodiment thereof illustrated in the accompanying drawing.

Figure 2:
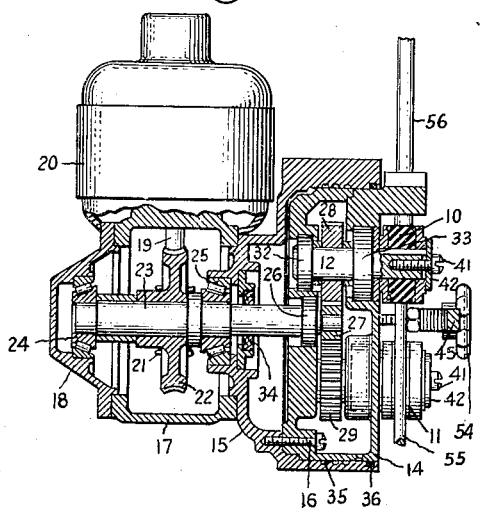
Figure 3:
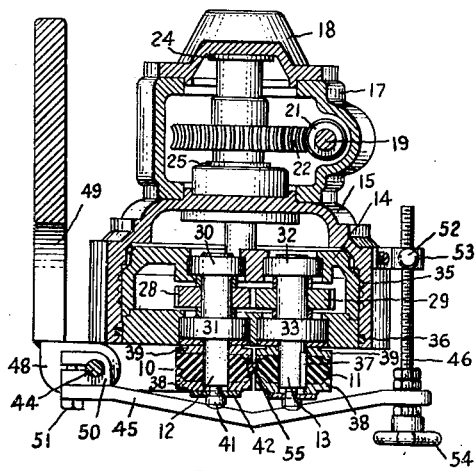
Figure 4:
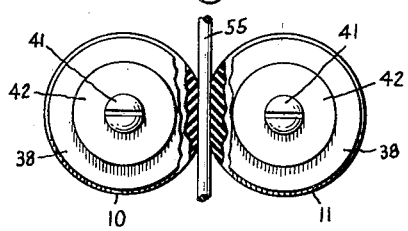
Figure 5:
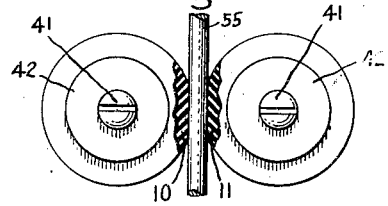
Figure 6:
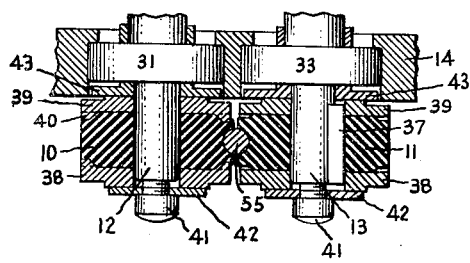

In this drawing Fig. 1 is a front view of the electrode feeding mechanism of an automatic arc welding head embodying my invention; Fig. 2 is a side view thereof with parts sectioned along the line 2—2 of Fig. 1; Fig. 3 is a plan view thereof with parts sectioned along the line 3—3 of Fig. 1; Figs. 4 and 5 are views illustrating the adjustment of the elastic feed rolls for engaging electrodes of different sizes; and Fig. 6 is a sectional view along line 3—3 illustrating in greater detail the construction of the feed rolls and of the means employed for adjusting their diameters to vary the spacing of their treads for electrodes of different sizes.

As shown in the drawing, two pairs of feed rolls 10, 11 are mounted on the ends of shafts 12 and 13 which project from a gear box 14. This gear box is cylindrical in shape and secured in a cylindrical seat within a housing 15 by a screw 16. One end of housing 15 is bolted to and closes one end of a housing 17 whose other end is closed by a plate 18.

The armature shaft 19 of a motor 20 mounted on housing 17 is connected through a worm 21 and a worm wheel 22 to a shaft 23. This shaft is supported for rotation in bearings 24 and 25 located in opposite ends of housing 17 which encloses the worm and worm wheel drive above referred to. One end of shaft 23 also extends through housing 15 into gear box 14. This end of the shaft is supported in a ball bearing 26 mounted in the inner or back wall of the gear box.

A spur gear 27 mounted on the end of shaft 23 which is located within gear box 14, meshes with and drives each of two gears 28 which is mounted on and imparts rotation to each of the two axles 12 for each of the feed rolls 10 of the two pairs of feed rolls 10, 11. Each gear 28 also meshes with a gear 29 which is mounted on and imparts rotation to each of the shafts 13 for each of the feed rolls 11 of the two pairs of feed rolls 10, 11. Each of the shafts 12 and 13 of each pair of shafts is spaced from one another by a fixed distance determined by their supporting ball bearings 30, 31, 32 and 33 which are located in the front and back walls of gear box 14. This spacing is that determined by the proper meshing of gears 28 with gears 29. Gears 28 are also properly spaced from gear 27 so that these gears properly mesh with one another.

Gears 27, 28 and 29 are totally enclosed within gear box 14 which may be filled with a high temperature grease introduced therein through a normally plugged filler hole in its front wall. In like manner worm 21, worm wheel 22, bearings 24 and 25, and shaft 23 in housing 17 are lubricated with grease supplied to this housing through a breather opening therein. A packing 34 surrounding shaft 23 where it passes into housing 15 prevents loss of lubricant from housing 17 into housing 15. Lubricant which may leak from gear box 14 is also kept out of housing 17 by packing 34. This leakage lubricant is also prevented from passing between gear box 14 and its seat in housing 15 by the use of a heavy grease in grooves 35 located in the side walls of the seat. A packing 36 between the gear box and its seat in housing 15 may also be provided for preventing leakage of lubricant from this housing.

Feed rolls 10 and 11 may be made of an elastic material such as rubber. Preferably a rubber such as used in automobile tires is employed since this gives the necessary wear resisting qualities to the feed rolls. These feed rolls are essentially tires mounted for rotation with shafts 12 and 13 by being attached thereto through keys 37. These keys also engage keyways in side plates or shrouds 38 and 39 which frictionally engage opposite sides of the feed rolls. The outer portions of side plates 38 and 39 which engage the side surfaces of the feed rolls are also provided with a plurality of circumferentially spaced teeth 40 which engage and prevent rotation of the feed rolls relative thereto. It will thus be seen that the feed rolls are caused to rotate with the shafts on which they are mounted by being both directly keyed to these shafts and indirectly keyed thereto through side plates 38 and 39.

Means are also provided for applying pressure to the sides of the feed rolls to deform them and thus control their diameters and consequently the spacing of their treads. This is accomplished by controlling the spacing of side plates 38 and 39 through the adjustment of screws 41 which are threaded into the ends of shafts 12 and 13. The heads of these screws engage washers 42 which bear against side plates 38. Consequently, by adjusting screws 41 pressure is applied between side plates 38 and 39 through the agency of washers 42 and shafts 12 and 13 whose inner ends are headed and transmit pressure through the inner races of bearings 30, 31, 32 and 33, gears 28 and 29 and the spacing ring between these gears and the ball bearings previously mentioned to washers 43 which engage side plates 39. By tightening screws 41 the feed rolls are compressed and deformed in a manner to increase their diameters. In making this adjustment the feed rolls should be calipered to insure that they are all adjusted to the same diameter. This will avoid excessive wear of the feed rolls and their drive as well as prevent unnecessary loading of their driving motor 20.

In Figs. 4 and 5 two adjustments of the feed rolls have been illustrated. In Fig. 4 the treads of the feed rolls have been advanced toward one another a sufficient distance to engage and drive a smaller size electrode 55 than is shown in Fig. 5 where the feed rolls have not been expanded beyond the diameter of their side plates.

It is thus apparent that by providing expansible feed rolls whose diameters are adjustable, all the advantages resulting from a fixed spacing of the driving shafts for these feed rolls may be obtained in an automatic arc welding head which is suitable for feeding electrodes of various sizes. The electrodes may be bare, lightly coated or heavily coated with flux.

These expansible feed rolls and their adjustment also simplify the construction of the welding head making it possible more readily to adapt other adjusting devices thereto. Thus, for example, the arc welding head illustrated in the drawing may be adjusted about a hinge pin 44 through the agency of an arm 45 and an adjusting screw 46. The welding head is supported for rotation about this hinge pin through the agency of lugs 47 which form part of the front wall of gear box 14. This hinge pin is held against rotation in lugs 48 of a supporting bracket 49. One end of arm 45 is provided with a clamp 50 which when closed by tightening nut 51 firmly engages hinge pin 44 and its other end is provided with an opening for adjusting screw 46. One end of this adjusting screw is supported for rotation and a slight swinging movement relative to arm 45 but is immovable lengthwise relative thereto. The other end of this adjusting screw 46 is threaded transversely through an opening in a cylindrical nut 52 which is mounted for rotation in a bracket 53 which is attached to housing 15 of the welding head. A hand wheel 54 is provided for rotating the adjusting screw 46. It will thus be seen that by turning screw 46 the welding head may be swung about hinge pin 44 to provide a cross adjustment thereof relative to the seam being welded. This particular adjusting mechanism is described and claimed in United States Letters Patent 2,250,219 Verni J. Chapman granted July 22, 1941 and assigned to the same assignee as the present application.

The electrode 55 above referred to is directed between feed rolls 10, 11 by a guide 56 mounted in the upper hinge lug 47 of gear box 14. This electrode may be supplied from a reel supporting a continuous coil thereof.

It is of course apparent that many modifications may be made of the electrode feeding mechanism above described. For example, my invention is not limited to the use of pairs of elastic feed rolls which are directly mounted on and attached to their feed shafts. Any form of expansible feed roll which is suitably supported on its drive shaft through an adjusting mechanism which is capable of controlling its diameter may be used alone or in pairs as a substitute for the particular arrangement illustrated and described. Furthermore, instead of using an elastic feed roll, an elastic ring carried in a V notch formed by the two parts of a pulley may be employed. By adjusting the two parts of the pulley relatively to one another, the V notch may be opened or closed in order to cause the elastic ring to expand or contract and thus change its effective diameter. Deformation of an elastic feed roll may also be accomplished through pneumatic or hydraulic pressure. Other arrangements will occur to those skilled in the art in view of the embodiment above described. Thus, while I have shown and described but one embodiment of my invention, it will be understood that I intend to cover by the appended claims all modifications of my invention which fall within the true spirit and scope thereof.

What I claim as new and desire to secure by Letters Patent of the United States is:

1. An arc welding head comprising a pair of shafts spaced from one another by a fixed distance, means for rotating at least one of said shafts, an expansible feed roll forming one of a pair of feed rolls mounted opposite one another on said shafts, and means for adjustably varying the diameter of said expansible feed roll to control its driving engagement with electrodes of different sizes positioned between said feed rolls.

2. An arc welding head comprising a pair of shafts spaced from one another by a fixed distance, means including gears mounted on said shafts for rotating them in opposite directions, a pair of expansible tires of elastic material mounted opposite one another on said shafts for rotation therewith, and means for adjusting the expansion of said tires to control their driving engagement with electrodes of different sizes positioned therebetween.

3. An arc welding head comprising a pair of shafts spaced from one another by a fixed distance, means for rotating at least one of said shafts, a pair of expansible feed rolls mounted opposite one another on said shafts for rotation therewith and having treads spaced from one another and adapted to making a driving engagement with an electrode positioned therebetween, and means for adjusting the expansion of said expansible feed rolls to vary their diameters and the spacing of their treads for electrodes of different sizes.

4. An arc welding head comprising a pair of shafts spaced from one another by a fixed distance, means including gears mounted on said shafts for rotating them in opposite directions, a pair of rubber feed rolls mounted opposite one another on said shafts for rotation therewith and having spaced treads adapted to making a driving engagement with an electrode positioned therebetween, and means for applying an adjustable clamping pressure to the sides of said feed rolls to control through deformation their diameters and the spacing of their treads for electrodes of different sizes positioned therebetween.

5. An arc welding head comprising a totally enclosed gear box, a pair of parallel shafts supported in fixed relationship relative to one another in said gear box and having corresponding end portions projecting from one wall of said gear box, means including gearing in said gear box for rotating said shafts in opposite directions, elastic feed rolls mounted opposite one another on said end portions of said shafts for rotation therewith, side plates keyed to said end portions of said shafts on opposite sides of said elastic feed rolls, and means for applying an adjustable clamping pressure through said side plates to the sides of said elastic feed rolls and consequently controlling through deformation the diameters of said feed rolls.

JASPER E. ANDERSON.